United States Patent [19]

Adams et al.

[11] Patent Number: 4,923,147
[45] Date of Patent: May 8, 1990

[54] HEAD SUPPORT/SPINE OFFLOADING EJECTION SEAT INSERT

[75] Inventors: William J. Adams, Torrance; Robert E. Zegler, Redondo Beach; Conrad B. Monson, Yorba Linda, all of Calif.

[73] Assignee: Rockwell International Corporation, El Segundo, Calif.

[21] Appl. No.: 249,794

[22] Filed: Sep. 27, 1988

[51] Int. Cl.$^5$ ............................................. B64D 25/04
[52] U.S. Cl. ........................ 244/122 AG; 244/122 R; 297/4
[58] Field of Search .................... 244/122 R, 122 AG; 297/4, 216, 465

[56] References Cited

U.S. PATENT DOCUMENTS

| | | | |
|---|---|---|---|
| 2,442,375 | 6/1948 | Paxton | 297/4 |
| 2,634,802 | 4/1953 | Stumm | 155/89 |
| 2,707,087 | 4/1955 | Bradley | 244/122 |
| 3,093,407 | 6/1963 | Wilson | 297/4 |
| 3,278,230 | 10/1966 | Boyce et al. | 297/384 |
| 3,302,633 | 2/1967 | Vykukal | 128/1 |
| 3,329,464 | 7/1967 | Barwood | 297/389 |
| 3,337,264 | 8/1967 | Collins et al. | 297/191 |
| 3,524,679 | 8/1970 | de Lavenne | 297/384 |
| 3,540,776 | 11/1970 | Wilson | 297/4 |
| 3,698,670 | 10/1972 | Ewing | 244/122 |
| 3,811,701 | 5/1974 | Grime | 280/150 |
| 3,826,434 | 7/1974 | Von Beckh | 244/122 |
| 3,966,146 | 6/1976 | Roberts | 244/122 |
| 4,004,763 | 1/1977 | Bunnell | 244/122 |
| 4,300,799 | 11/1981 | Cunningham | 297/487 |
| 4,488,691 | 12/1984 | Borch | 244/151 |
| 4,638,510 | 1/1987 | Hubbard | 297/465 |
| 4,664,341 | 5/1987 | Cummings | 244/122 |
| 4,784,352 | 11/1988 | Smith et al. | 244/122 AG |

FOREIGN PATENT DOCUMENTS

| | | | |
|---|---|---|---|
| 356862 | 9/1931 | United Kingdom | 244/122 B |
| 8801968 | 3/1988 | World Int. Prop. O. | 244/122 AG |

Primary Examiner—Joseph F. Peters, Jr.
Assistant Examiner—Rodney Corl
Attorney, Agent, or Firm—Charles T. Silberberg; Lawrence N. Ginsberg

[57] ABSTRACT

A seat insert insertable within the existing seat of a vehicle for maintaining a crew member of the vehicle in a forward posture during high G acceleration. An elongated head support member is provided for supporting the crew member's head during a forward leaning posture. A back plate assembly including at least one back plate is connected to the head support member for supporting the spine in its natural curvature. Means being connected to the back plate assembly are provided for pivoting the back plate assembly forward relative to the seat of the vehicle. Means are provided for transfering any G-induced weight from the spine to the back plate assembly and ultimately to the existing seat of the vehicle. The head support member is restrained in such a manner so as to maintain the crew member's head in an "eyes up" attitude during a forward lean. The seat insert reduces the risk of spinal injury by off-loading the pilot's spine and supporting the spine in its natural curvature, thereby preventing harmful bending of the spine and non-uniform load distribution across individual vertebrae interfaces.

19 Claims, 6 Drawing Sheets

HEAD SUPPORT SPINE OFFLOADING EJECTION SEAT INSERT

BACKGROUND OF THE INVENTION

1. Field of the Invention

This invention relates to restraint systems and seat systems and more particularly to a seat insert, insertable within the existing seat of a vehicle, for protecting the crew member of the vehicle from high "G" accelerations resulting from aircraft maneuvers and/or emergency ejections from the aircraft.

2. Description of the Related Art

Modern high performance fighter aircraft are capable of flight maneuvers which subject the crew members to very high accelerations, "G's", particularly in the head-to-foot direction. Severe stresses are placed upon the crew members by such aircraft maneuvers. Indeed, many modern aircraft are capable of aerial maneuvers which are beyond the tolerance of the human crew members. Consequently, fighter aircraft and their crew members are occasionally lost as a result of pilot G-induced Loss of Consciousness (G-LOC).

Aircraft equipment malfunction or adverse environmental conditions ma occasionally make proper control of the aircraft so difficult as to render it improbable that the aircraft can be safely landed. Enemy fire in combat situations may seriously disable an aircraft or crew member making it also improbable that the aircraft can be brought to a safe landing. In such situations, ejection of the crew members from the aircraft may be desirable. However, in some such situations, the high forces of acceleration generated by catapult ejection systems may be added to the forces generated by the motion of the aircraft and the total forces may thus exceed the tolerance of the crew members. Consequently, pilots and their crew members are occasionally killed or severely disabled as a result of ejection from an aircraft.

Several approaches have been proposed for solving the problem of high "G" accelerations. For example, U.S. Pat. No. 4,664,341 issued to R. J. Cummings, entitled "Head Restraint System" (assigned to Rockwell International Corporation), discloses a system which helps enable free and unencumbered head movement during tolerable lateral inertia forces, while locking in place and protecting the pilot's head during periods of high lateral inertia forces. The invention utilizes a helmet that rotates on a track and in an inertia reel, which will lock when lateral forces exceed predetermined levels.

Co-pending U.S. Ser. No. 175,660, by S. G. Wurst, entitled "High G Protection System" (assigned to Rockwell International Corporation), discloses a seat restraint system for supporting the occupant in a leaned forward or crouched position. This results in a reduced hydrostatic blood column (the distance between the aorta and retina of the eye). The Wurst Application discloses a rigid support plate for supporting the occupant's upper torso when in a forwardly crouched position. The support plate is pivotly connected to the seat by a U-joint. A spring is utilized to maintain a force with a magnitude proportional to the G-induced forces. A seat pan is disclosed which is upwardly rotatable to augment the angle of crouch of the occupant while his forearms are rested on appropriately positioned arm rests to also provide support to the upper torso.

U.S. Pat. Ser. No. 865,508 to E. A. Smith, B. J. Courter, and S. G. Wurst, entitled "Forward Posture Support Seat System" (also assigned to Rockwell International Corporation) discloses a restraint system which helps provide protection against the compression of the vertebrae of the spine caused by high G-induced forces resulting from ejection from the aircraft as well as aircraft maneuvers. The invention utilizes a seat insert which is rotatably connected to the seat to provide multi-axis rotation (allows crew member to turn in the seat). Such a rotation is provided by a ball-type joint and telescoping strut. The Smith patent also teaches use of a strap harness which secures the crew member to the seat back; an inertia reel; and torso support means, which is lockable when the crew member is in a crouched over position such that fore and aft motion of the crew member is substantially precluded. Although providing some protection against compression of the vertebrae of the spine caused by high forces of acceleration, the Smith patent does not address the issue of reducing the risk of injury to the spine during seating postures ranging from upright to full forward lean (approximately 42°).

Other prior art systems for providing the crew member protection against G-induced forces include strap restraints and cord systems for retaining the pilot or crew members firmly against the seat. Such systems may use a pair of cords connecting the sides of the helmet to the shoulders of the pilot or crew member. Another pair of cords are attached to the first pair and secured to a reeling in device at the back of the seat in order to pull the pilot's helmet and shoulders firmly against the seat upon the application of forces of acceleration. Such restraint systems may be unduly complex and severely limit the movement of the crew member in the seat. An example of such a restraint system is U.S. Pat. No. 3,329,464 issued to A. J. Barwood.

Some prior art systems use a pad positioned over the chest of the crew member to apply restraint directly to the crew member's chest. However, such chest pads are functionally the same as and, thus, no more effective than the strap restraint system described herein above. Two examples of such prior art restraint systems using chest pads are U.S. Pat. 3,852,679 issued to H. Y. de Lavenne and U.S. Pat. No. 4,300,799 issued to D. J. Cunningham.

Although restraint of the head and upper torso prevents excessive forward bending of the body, restraint results in compressive forces along the spine. These forces generate back and neck pain. A seat system is thus needed that will provide protection against the compression of the vertebrae of the spine caused by high forces of acceleration resulting from ejection from the aircraft, as well as aircraft maneuvers, while still allowing sufficient pilot mobility, good visibility, and good access to the controls.

OBJECTS AND SUMMARY OF THE INVENTION

It is a principle object of the present invention, therefore, to provide protection to the crew member of an aircraft from the forces of acceleration resulting from aircraft maneuvers and from ejection from the aircraft.

It is another object of the present invention to provide a seat insert for the crew member of the aircraft, which retains and supports the crew member in a forward posture position for reducing the effective aorta-retina hydrostatic column.

It is another object of the present invention to provide a forward posture seat insert, which allows the crew member good mobility in the seat, good visibility of the instrument panel and the surrounding environment and good manual access to the controls.

It is another object of the present invention to provide a seat insert which provides the crew member with spinal support and G-induced body weight offloading to reduce the risk of spinal injury during forward leaning high G conditions and upright seating ejection conditions.

Yet another object is to provide a seat insert which requires minimal modification to the existing aircraft seat and cockpit structure.

Still another object of the present invention is to provide a seat insert G protection system with minimal don/doff requirements for easy ingress and rapid emergency egress.

Another object is to provide a seat insert with minimal interconnectability with the existing ejection seat; thereby, ensuring rapid positive separation of the sea insert from the seat during the seat/man separation phase of ejection and escape.

Yet another object of the present invention is to provide a seat insert which is integrated with the crew member parachute harness system and allows unimpeded body positioning for parachute opening shock and crew member leg extension for parachute landing.

The present invention is a seat insert insertable within the existing seat of a vehicle for maintaining a crew member of the vehicle in a forward posture during high-G acceleration. In its broadest aspects, the invention comprises an elongated head support member for supporting the crew member's head during a forward leaning posture., a back plate assembly including at least one back plate connected to the head support member for supporting the spine in its natural curvature; means being connected to the back plate assembly for pivoting the back plate assembly forward relative to the seat of the vehicle; means for transferring any G-induced weight from the spine to the back plate assembly and ultimately to the existing seat of the vehicle; and means for restraining the head support member in such a manner so as to maintain the crew member's head in an "eyes up" attitude during a forward lean.

In its more narrower aspects, the back plate assembly includes a thoracic back plate and a lumbar back plate each having substantially the same curvature as its respective portion of the spine and being attached in a manner that provides relative yaw motion therebetween. The means for restraining the head support member in an "eyes up" attitude includes a head support member restraint cord connected at a top end to the head support member and at a bottom end to a fixed point which does not articulate forward with the back plate assembly. In a preferred embodiment this fixed point is located on a seat pan base assembly which is contoured to fit upon the seat of the vehicle and about the crew member's buttocks. The seat pan base assembly includes means for pivotly connecting the seat pan base assembly to hip extensions extending from the back plate assembly, thereby allowing transference of G-induced loads from the hip extensions to the seat pa base assembly. The restraint cord has sufficient length to restrain the head support member movement during a crew member's forward lean.

The seat insert of the present invention reduces the risk of spinal injury by off-loading the pilot's spine and supporting the spine in its natural curvature, thereby preventing (1) harmful bending of the spine, and (2) non-uniform load distribution across individual vertebrae interfaces, both situations of which are known to cause spinal injury during high-G manuevering and ejection.

During tactical high G conditions, the crew member experiences G-induced or increased body weight. This causes the crew member's body to become heavy and sink into the seat. This "sinking" of the body and head serves to compress the spine. The present invention aids in alleviating this problem by allowing the crew member to firmly secure himself between the back plate assembly and a chest plate, thereby, preventing excessive sinking of the body and compression of the spine in the G-induced environment, and by providing a head support system which aids in restraining the head up off of the spine in the G-induced environment. Since the invention serves to hold the body up in the G-induced environment, it effectively serves to off load the crew member's spine by transfering the G-induced body weight through the back plate assembly to the hip extensions, and ultimately to the seat structure.

Other objects advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENT

Figures 1, 3:
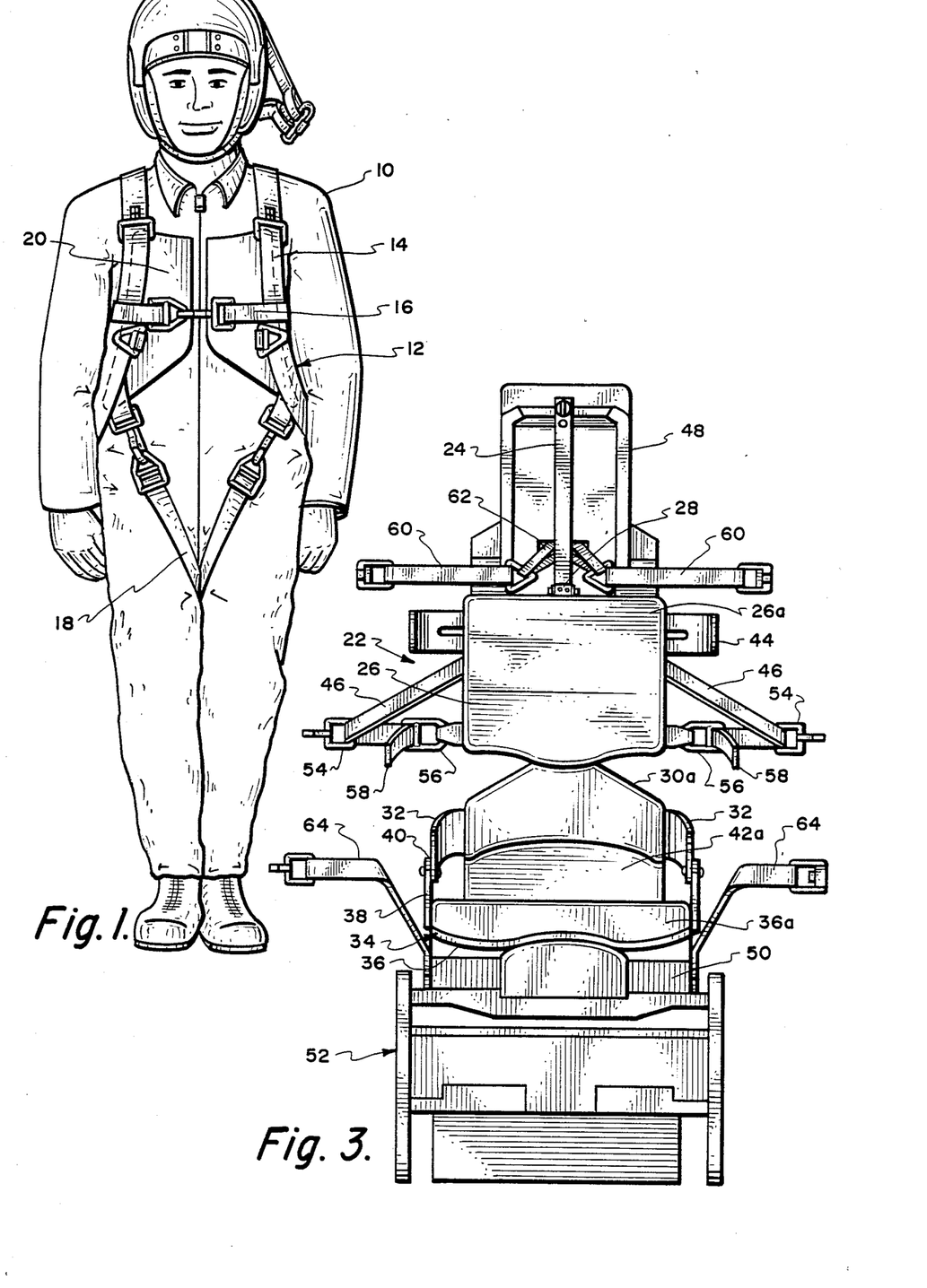
FIG. 1 illustrates a front view of a standing crew member wearing a restraint harness containing the chest plate portion of the present invention.
FIG. 3 is a front view of the seat insert of the present invention shown in place upon a seat pan and seat back of a pilot's seat, the straps being elevated.

Referring to the drawings and the characters of reference marked thereon FIG. 1 illustrates a pilot 10 wearing a restraint harness generally designated 12 of a type typically utilized by pilots in fighter aircraft. The restraint harness 12 is used to help secure the pilot in the seat as described below and to allow connection with a parachute. The harness 12 includes shoulder straps 14 which extend around the back and down the chest. The shoulder straps 14 are linked by a cross strap 16 extending across the lower chest or upper abdomen. Leg straps 18 are also provided to maintain the necessary support required for ejection with a parachute.

In conjunction with the present invention, the restraint harness 12 aids in securing a two-piece chest plate 20 which insures uniform distribution of loads over the crew member's rib cage while undergoing high G-induced forces during a forward lean.

Figure 2:
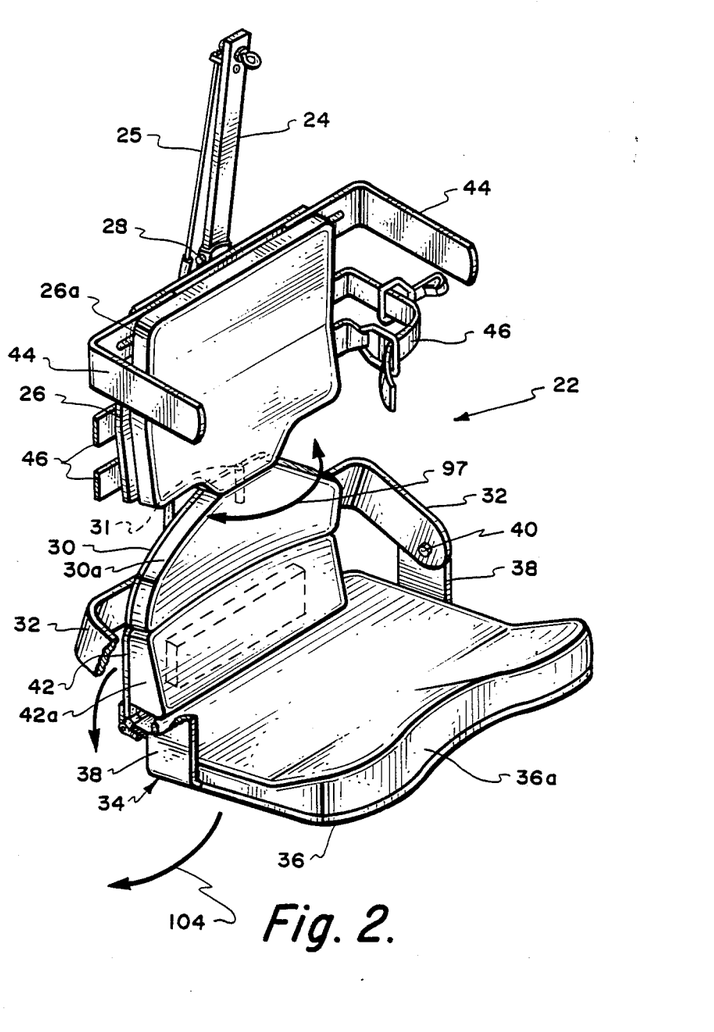
FIG. 2 is a perspective view of a preferred embodiment of the seat insert of the present invention.

Referring now to FIG. 2, a seat insert designed in accordance with the principles of the present invention, generally designated 22, is illustrated. The seat insert 22 includes an elongated head support member 24 for supporting the crew member's head during a forward leaning posture. A head support member restraint cord 25 is provided to restrain head support member 24 movement during a crew member forward lean.

The lower end of the head support member 24 is connected to the upper end of a thoracic back plate 26 by a cervical spring 28. The cervical spring 28 biases the head support member 24 toward a forward position, as explained in more detail below. The thoracic back plate 26 has a front surface with substantially the same curvature as the thoracic spine of the crew member.

A lumbar back plate 30, having a front surface with substantially the same surface curvature as the lumbar spine of the crew member, is attached to the lower end of the thoracic back plate 26 by a post and socket yaw joint 31. Two forwardly extending hip extensions 32, each integral with (or rigidly connected to) a respective side of the lumbar back plate 30 are provided for lateral hip support and for securing the lumbar back plate 30 to a seat pan base assembly 34 which is contoured to fit on the seat pan of the vehicle and about the crew member's buttocks. The seat pan base assembly 34 includes a seat pan base 36 having lateral upwardly extending projections or receptors 38 which are connected to the hip extensions by pivoting pin joints 40. The seat pan base assembly 34 also includes a pelvic support wedge 42 located between the seat pan base 36 and the lumbar back plate 30 and hinged to the aft end of the seat pan base 36.

A pair of forward extending, fixed, lateral support plates 44 are fixed to the sides of the thoracic back plate 26 (at shoulder height) for maintaining crew member body support during lateral force input. Thoracic straps 46 are attached to the thoracic back plate 26 for allowing the crew member 10 to tightly secure himself between a chest plate and the thoracic back plate 26, as described in detail below.

The thoracic back plate 26, lumbar back plate 30, support wedge 42 and seat pan base 36 each have foam inserts designated 26a, 30a, 42a, and 36a, respectively (preferably formed of polyurethane) for comfort.

Referring now to FIG. 3, the seat insert 22, of the present invention is illustrated in place upon a seat back 48 and seat pan 50 of a seat structure generally designated 52. Each thoracic strap 46 wraps through a rapid egress snap hook 54 and then through an adjustor 56 attached to the lower end of the thoracic back plate 26. The thoracic straps 46 are wrapped around the thorax of the crew member 10 during use and are adjustable so as to allow the crew member to tightly secure himself between a chest plate (described below) and the thoracic back plate 26. The straps may be tightened by pulling on ends 58. The head support member 24 has a vertical height substantially equal to the height of the seat 48 for not interfering with any cockpit structure external to the seat.

FIG. 3 also illustrates that shoulder straps 60 (which are not part of the seat insert, itself) extend from inertia reels 62 located in the seat back behind the head support member 24. Lap belts 64 (also not part of the seat insert, itself) are also used to secure the crew member 10 to the seat structure 52.

Figure 4:
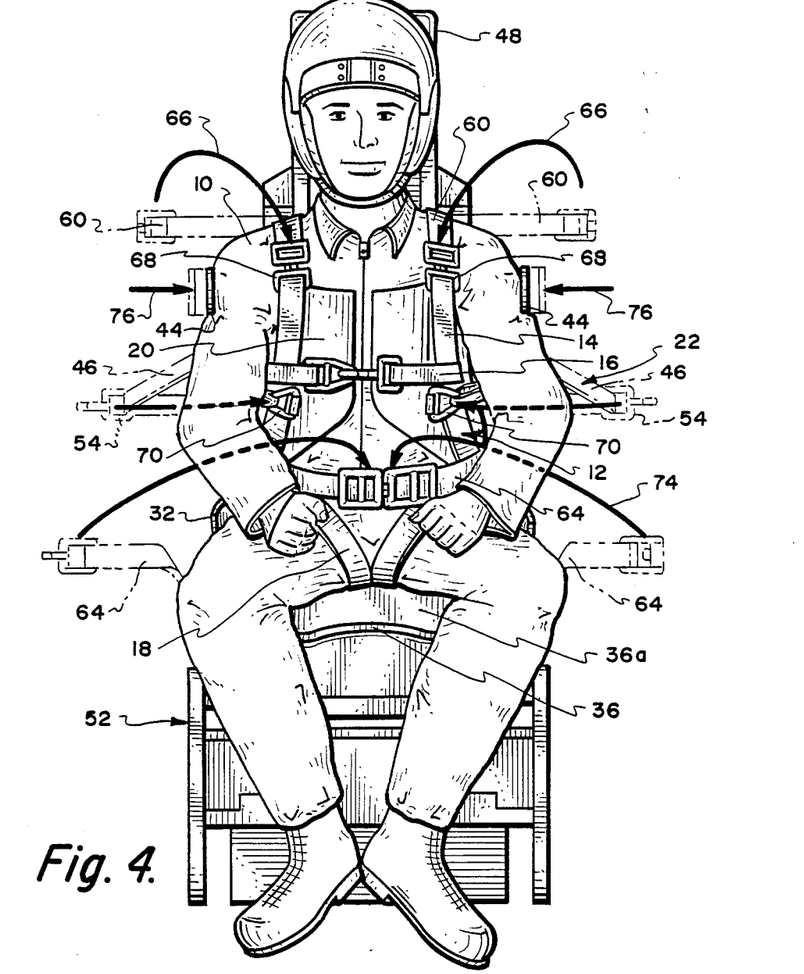
FIG. 4 is a front view showing a crew member strapped onto the seat insert of the present invention in place upon the cockpit seat.

Referring now to FIG. 4, a pilot is shown seated on the seat structure 52 with the seat insert 22 attached. It can be seen (i.e. arrows 66) that the straps 60 originating from the inertia reels 62 are attached to buckles 68 on the shoulder straps 14 of restraint harness 12. The thoracic straps 46 attach to buckles 70 on the restraint harness 12. Thus, in conjunction with the restraint harness 12, the thoracic straps 46 secure the chest plate 20 in position. Arrows 74 illustrate connection of the lap belts 64. Furthermore, the forward extending lateral support plates 44 are shown to be adjustable, as denoted by arrows 76, for differing pilot sizes.

Figure 5:
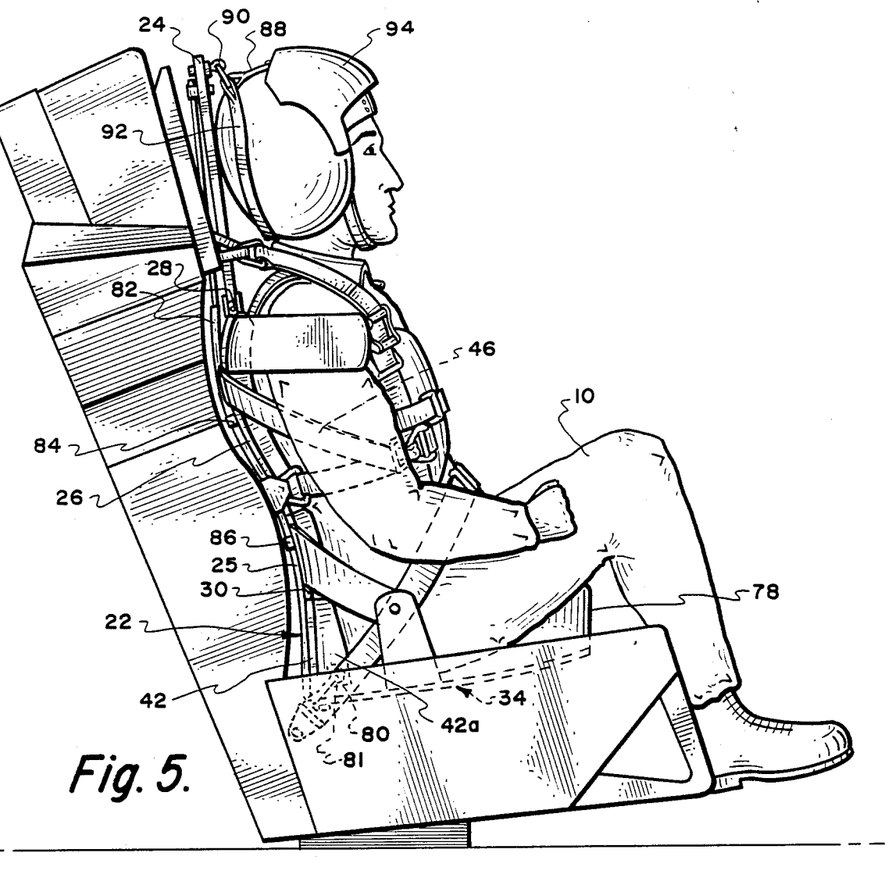
FIG. 5 is a side view showing the crew member strapped onto the seat insert in an upright position.

Referring now to FIG. 5, a side view of the crew member strapped onto the seat insert 22 in a upright position is shown. The thoracic straps 46 are oriented at an angle which is as parallel as possible to the pilot's spine to allow the pilot to be effectively "picked up" off of his spine during G-loading. FIG. 5 illustrates that the seat pan base assembly 34 includes a knee elevation wedge 78, having an apex at approximately the midpoint of the seat pan base assembly 34 and terminating at a high end at the fore edge of the seat pan base assembly 34 for elevating the legs of the pilot, thereby reducing the total blood "hydrostatic" column.

The novel head support member restraint cord 25 is securably attached at a top end to the head support member 24 and at a bottom end to a housing 80 contiguous with the support wedge 42, 42a and containing another inertia reel 81. (The housing 80 is schematically illustrated in phantom in FIG. 2.) The restraint cord 25 is preferably formed of a steel wire or cord. The lower portion of the restraint cord 25 is covered by a sheath 82 for limiting exposure of the restraint cord 25. The sheath 82 may be formed of plastic, rubber or other resilient material and is anchored at locations 84, 86 to the thoracic back plate 26 and lumbar back plate 30. An upper helmet support strap 88 extends from a helmet strap receptor hook 90 secured to the upper end of the head support member 24 for distributing weight off of the cervical spine and for maintaining the head in an "eyes forward" attitude and forward lean. A second strap 92 extends from receptor hook 90 to the lower back of the helmet 94 for limiting head/helmet differential rotation.

Figure 6:
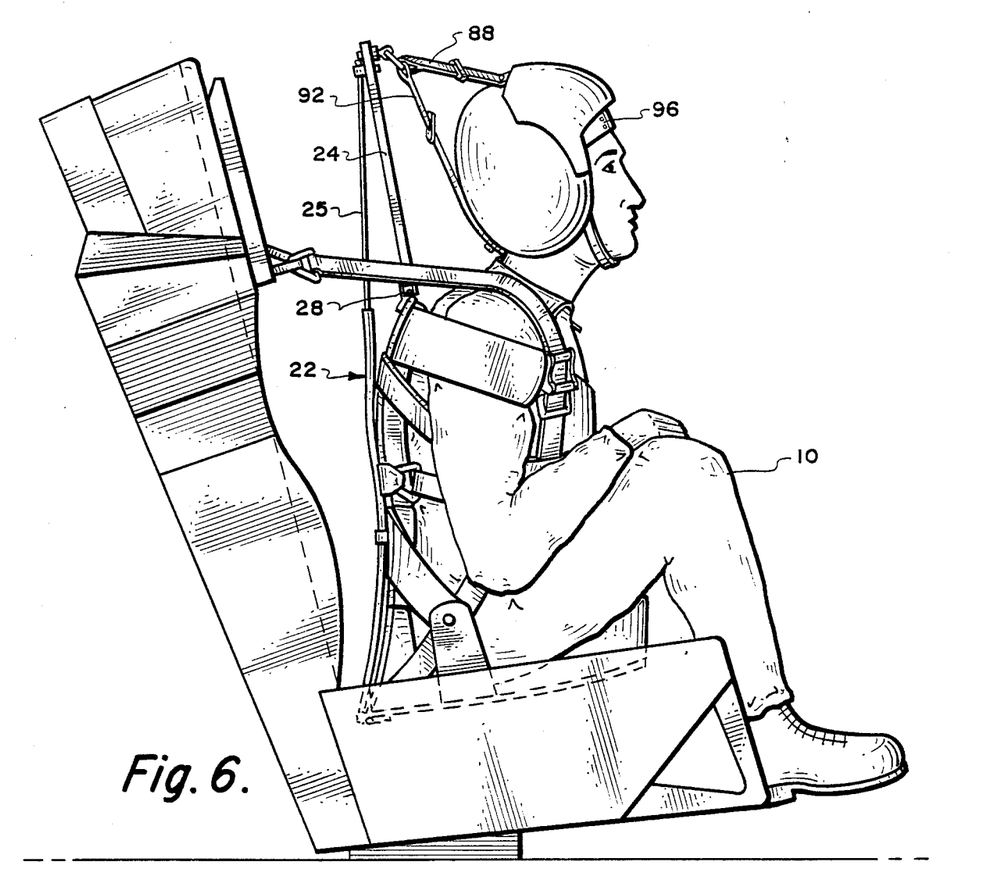
FIG. 6 is a side view showing the crew member in a forward leaning posture.

These features can be seen with greater clarity by referring to FIG. 6 in which the pilot 10 is illustrated in a forward leaning posture. In this figure it can be see that while experiencing high G's the pilot 10 with the seat insert 22 tightly secured thereto has moved forward. As he moves forward, a small amount of slack (perhaps 2 to 3 inches) which was contained within the inertia reel 81 (not shown in this Figure), which secures the restraint cord 25, is eventually used up. As previously noted, the cervical spring 28 serves to bias the head support member 24 toward a forward position keeping the restraint cord 25 taut. The pilot's head is tilted up in an "eyes forward" position (for tactical situation awareness) and supported by helmet support straps 88, 92. A forehead strap 96 similar to a nape strap is provided to keep the helmet from rotating off the head.

Figure 7:
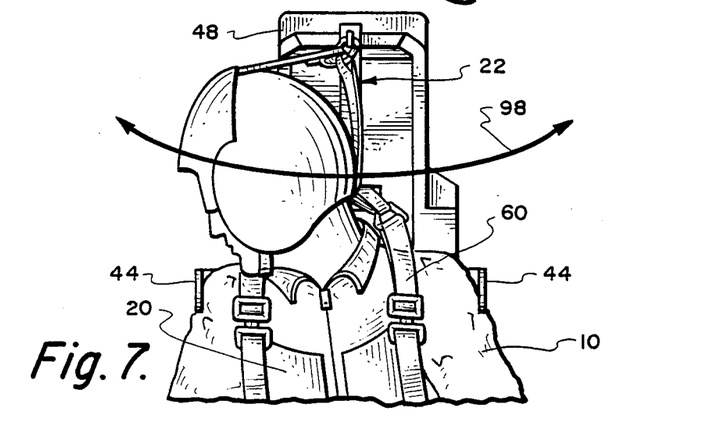
FIG. 7 illustrates how the present invention allows the pilot to look from side to side and "check 6 o'clock" without impairment.
Figure 8:
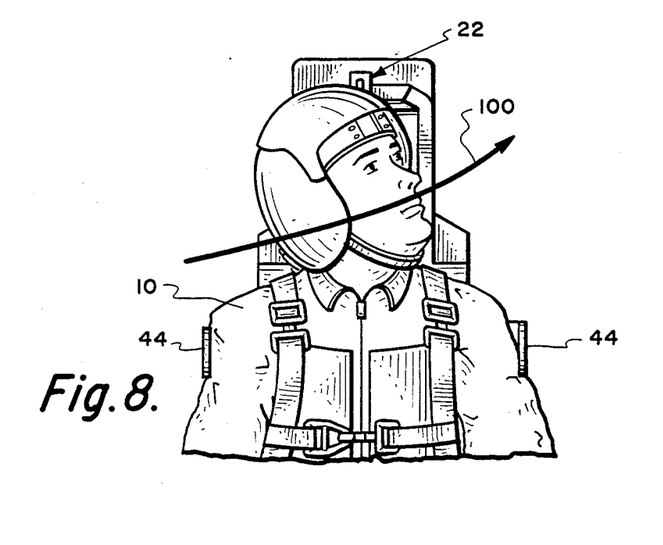
FIG. 8 illustrates how the present invention allows the pilot to look up without impairment.
Figure 9:
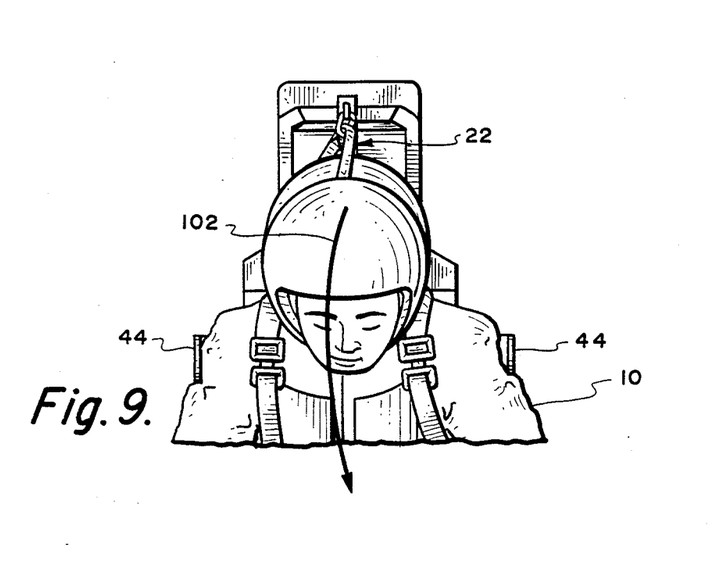
FIG. 9 illustrates the pilot looking down without impairment when in an upright position.

Thus, utilization of the seat insert 22 of the present invention allows the pilot 10 to twist his back (see arrows 97 in FIG. 2) and neck to "check 6 o'clock" as illustrated by arrows 98 in FIG. 7. Furthermore, pilot 10 can look up as illustrated by arrows 100 in FIG. 8 and look down as illustrated by arrows 102 in FIG. 9. In all positions, lateral body movements are restricted by the lateral shoulder support plates 44.

Reiterating to some degree what was previously stated, in the operation of the seat insert system, a pilot 10 wearing a restraint harness 12 goes through his normal cockpit ingress procedures and secures himself to the seat insert 22 with the thoracic straps 46. The pilot then connects his lap belt 64 and inertia reel attachment straps 60 and puts on his helmet with forehead strap, chin strap, and positive pressure breathing mask (not shown) attached. At the conclusion of these procedures, the pilot is secured to the seat and seat insert systems.

Once secured, the pilot can move toward a prescribed distance. This distance is determined by the length of the inertia reel attachment straps 60. In moving from an upright to a forward leaning position, the back plate assembly (i.e. thoracic back plate 26, lumbar back plate 30) and the chest plate 20 remain tightly secured to the pilot's body. The back plate assembly 26, 30 rotates forward about the hip flare receptor pivot pins 40. The restraint cord 25 eventually loses its slack as the lumbar back plate 30 moves away from the wedge 42. When the slack is completely taken up, the cord 25 will tense and restrain the head support member 24 from further unified motion with the back plates 26, 30. As a result, the head support member 24 can be maintained (with the proper initial cord length) in a substantially vertical position thus providing the support necessary through the helmet straps 88, 92 to keep the pilot's head in an "eyes forward" attitude for proper, straight ahead field of view.

In this forward leaning position, the compressive force along the pilot's spine is transferred to the seat pan base assembly 36 of the sea insert 22 and thus loaded directly back onto the seat pan structure. All the while, the head is held in a vertical position. In this orientation, the pilot can utilize the G-protection afforded by forward leaning without suffering neck and back pain. Just as importantly, his field of view remains close to the field of view, in the upright position, which is critical for tactical operation of the aircraft.

During ejection, the seat insert 22 remains secured to the pilot after seat/man separation. The bottom of the wedge 42 contacts the back end of the seat pan base 36 providing a structural link to absorb the high compressive forces associated with ejection normally borne by the back plate system 26, 30 during tactical maneuvers. These forces are distributed back to the seat pan base assembly 34 in the same fashion as described for spine offloading during tactical G-maneuvers. This additional offloading procedure provided for ejection reduces the risk of injury to the spine associated with excessively high ejection acceleration loads. Referring again to FIG. 2, as the seat/man separation phase of escape takes place, the pelvic support wedge 42 is passively mobilized (retracted) in the direction of arrows 106 to allow the seat pan base 36 of the insert to drop down in the direction of arrows 104 relative to the rigid back plate assembly 26, 30 for accomodating extension of the pilot's legs for a parachute landing.

The portions of the seat insert that must bear high loads, e.g. seat pan base assembly, hip extensions should be formed of a light-weight, high-strength material such as titanium. Portions such as the chest plate and lateral support plates, which are not required to bear such high compression loads, may be formed of carbon-based materials such as Kevlar or fiberglass.

Figure 10:
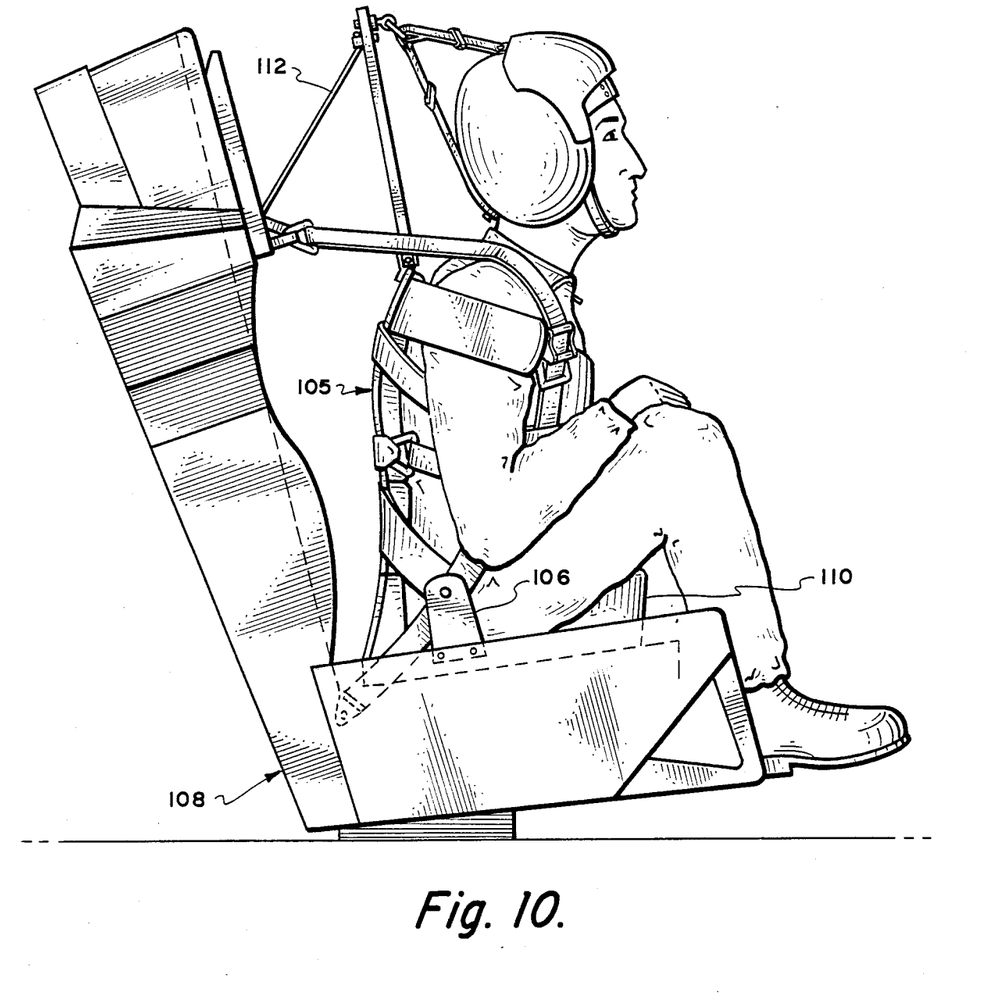
FIG. 10 illustrates an alternate embodiment of the present invention which does not require a seat pan base assembly.

Obviously, many modifications and variations of the present invention are possible in light of the above teachings. For example, referring now to FIG. 10 which illustrates an alternate embodiment generally designated 105, the rigid receptors 106 are connected directly to the seat structure 108, thereby eliminating the need for a seat pan base assembly. The pelvic support wedge and the knee elevation wedge are incorporated into one continuous seat cushion 110. The bottom end of the restraint cord 112 is anchored to the existing inertia reel system, not shown. The embodiment illustrated in FIG. 10 simplifies the design of the insert itself but requires modification of the existing seat structure. It is, therefore, to be understood that within the scope of the appended claims, the invention may be practiced otherwise than as specifically described.

What is claimed and desired to be secured by Letters Patent of the United States is:

1. A seat insert insertable within the existing seat of a vehicle for maintaining a crew member of the vehicle in a forward posture during high G acceleration, comprising:
   (a) an elongated head support member having an upper end and a lower end, said head support member for supporting the crew member's head during a forward leaning posture;
   (b) a back plate assembly including at least one back plate connected to the head support member for supporting the thoracic and lumbar spines in their natural curvatures;
   (c) means being connected to the back plate assembly for pivoting the back plate assembly forward relative to the seat of the vehicle;
   (d) means for transfering any G-induced weight from the spine to the back plate assembly and ultimately to the existing seat of the vehicle; and
   (e) means for restraining said head support member in such a manner so as to maintain the crew member's head in an "eyes up" attitude during a forward lean.

2. The seat insert as claimed in claim 1, wherein said back plate assembly includes;
   a thoracic back plate having a front surface with substantially the same curvature as the thoracic spine of the crew member, said thoracic back plate having an upper end being hingedly attached to the lower end of said head support member, and
   a lumbar back plate having a front surface with substantially the same curvature as the lumbar spine of the crew member, said lumbar back plate having an upper end being attached to the lower end of the thoracic back plate, means for providing relative yaw motion between said lumbar back plate and said thoracic back plate, said lumbar back plate and thoracic back plate serving to support the lumbar spine and thoracic spine in their natural curvatures, thereby minimizing the risk of injury due to non-uniform vertebrae interface loads.

3. The seat insert of claim 1 wherein said means being connected to the back plate assembly for pivoting the back plate assembly forward includes two forwardly extending hip pivot joints, each connected to a respective side of the back plate assembly.

4. The seat insert of claim 2 wherein said means for transferring any G-induced weight from the spine to the back plate assembly includes a chest plate strapped to said thoracic back plate for securing said crew member to said seat insert and for uniformly distributing loads over the crew member's rib cage due to G-induced body weight and during a forward leaning posture.

5. The seat insert of claim 4 wherein said chest plate is strapped to said thoracic back plate by means of a pair of lateral straps, each extending from a respective side of the thoracic back plate, each strap being adjustable so as to allow the crew member to tightly secure himself between the chest plate and the thoracic back plate.

6. The seat insert of claim 1 wherein said means for restraining said head support member includes a head support member restraint cord connected, at a top end, to said head support member and, at a bottom end, to a point that does not articulate forward with the back plate assembly.

7. The seat insert of claim 1 further including a first helmet support strap extending from the upper end of the head support member to the top of the crew member's helmet for distributing weight off of the cervical spine and for maintaining the head in a "eyes up" attitude and forward lean and a second strap which extends from the upper end of the head support member to the back of the helmet for limiting head/helmet differential rotation.

8. The seat insert of claim 1 wherein the upper end of said back plate assembly is hingedly attached to the lower end of said head support member by cervical spring means for biasing the head support member toward a forward position, thereby allowing the head support member to rotate aft to support the head in an "eyes up" attitude.

9. The seat insert of claim 2 further including a pair of forward extending, fixed lateral support plates each being fixed to a side of the thoracic back plate for maintaining crew member shoulder support during lateral force input during seating profiles from upright to forward lean.

10. The seat insert of claim 1, wherein said means for transferring any G-induced weight from the spine to the back plate assembly and ultimately to the existing seat of the vehicle includes a seat pan base assembly which is contoured to fit upon the seat of the vehicle and about the crew member's buttocks, said seat pan base assembly including said means for pivoting the back plate assembly forward relative to the seat of the vehicle.

11. A seat insert insertable within the existing seat of a vehicle for maintaining a crew member of the vehicle in a forward posture during high G acceleration, comprising:

(a) an elongated head support member having an upper end and a lower end, said head support member for supporting the crew member's head during a forward leaning posture;

(b) a thoracic back plate having a front surface with substantially the same curvature as the thoracic spine of the crew member, said thoracic back plate, having an upper end being hingedly attached to the lower end of said head support member;

(c) a lumbar back plate having a front surface with substantially the same curvature as the lumbar spine of the crew member, said lumbar back plate having an upper end being attached to the lower end of the thoracic back plate, means for providing relative yaw motion between said lumbar back plate and said thoracic back plate, said lumbar back plate and thoracic back plate serving to support the lumbar spine and thoracic spine in their natural curvatures, thereby minimizing the risk of injury due to non-uniform vertebrae interface loads;

(d) two forwardly extending hip extensions, each connected to a respective side of the lumbar back plate;

(e) a seat pan base assembly which is contoured to fit upon the seat of the vehicle and about the crew member's buttocks, said seat pan base assembly including means for pivotly connecting it to said hip extensions thereby allowing transference of g-induced loads from the hip extensions to the seat pan base assembly;

(f) a head support member restraint cord connected at a top end to said head support member and at a bottom end to said seat pan base assembly having a sufficient length to restrain head support member movement during a crew member's forward lean; and (g) a chest plate strapped to said thoracic back plate for securing said crew member to said seat insert and for uniformly distributing loads over the crew member's rib cage due to g-induced body weight and during a forward leaning posture.

12. The seat insert of claim 11 wherein said head support member has a vertical height substantially equal to the height of the seat of said vehicle for not interfering with any cockpit structure external to said seat.

13. The seat insert of claim 11 further including a first helmet support strap extending from the upper end of the head support member to the top of the crew member's helmet for distributing weight off of the cervical spine and for maintaining the head in an "eyes up" attitude in forward lean and a second strap which extends from the upper end of the head support member to the back of the helmet for limiting head/helmet differential rotation.

14. The seat insert of claim 11 wherein the upper end of said thoracic back plate is hingedly attached to the lower end of said head support member by cervical spring means for biasing the head support member toward a forward position, thereby allowing the head support member to rotate aft to support the head in an "eyes up" attitude.

15. The seat insert of claim 11 further including a pair of forward extending, fixed, lateral support plates, each being fixed to a side of the thoracic back plate for maintaining crew member shoulder support during lateral force input.

16. The seat insert of claim 11 wherein said chest plate is strapped to said thoracic back plate by means of a pair of lateral straps, each extending from a respective side of the thoracic back plate each strap being adjustable so as to allow the crew member to tightly secure himself between the chest plate and the thoracic back plate.

17. The seat insert of claim 11 wherein said seat pan base assembly includes a seat pan base and a pelvic support wedge, said pelvic support wedge located between the seat pan base and the lumbar back plate and hingedly attached to an aft end of the seat pan base to prevent the buttocks from being urged into any space between the seat pan base and the lumbar back plate during high G's, said pelvic support wedge hinged to the seat pan base in a manner that allows it to rotate aft after seat/man separation, thereby allowing the pilot to extend his legs for parachute landing.

18. The seat insert of claim 11 further including a knee elevation wedge integral with the seat pan base, having an apex at approximately the mid-point of the seat pan base and terminating at a high end at the fore edge of said seat pan base for elevating the legs of the pilot, thereby reducing the total blood "hydrostatic" column.

19. The seat insert of claim 11 wherein said hip extensions are connected to their respective sides of the lumbar back plate through a pair of rigid receptors extending generally vertically from the sides of said seat pan base, said hip extensions and rigid receptors each being connected by pivoting pin joints.

* * * * *